(No Model.)

M. E. THOMAS & G. C. TWYMAN.
BEARING.

No. 564,123.  Patented July 14, 1896.

WITNESSES
T. J. Keating.

INVENTORS:
Martin E. Thomas &
Goodloe C. Twyman.
By Duvall, Attorney

UNITED STATES PATENT OFFICE.

MARTIN E. THOMAS AND GOODLOE C. TWYMAN, OF BOWLING GREEN, KENTUCKY; SAID THOMAS ASSIGNOR TO SAID TWYMAN.

BEARING.

SPECIFICATION forming part of Letters Patent No. 564,123, dated July 14, 1896.

Application filed April 25, 1895. Serial No. 547,181. (No model.)

*To all whom it may concern:*

Be it known that we, MARTIN E. THOMAS and GOODLOE C. TWYMAN, citizens of the United States, residing at Bowling Green, in the county of Warren and State of Kentucky, have invented certain new and useful Improvements in Bearings; and we do hereby declare the following to be a full, clear, and exact description of the invention, such as will enable others skilled in the art to which it appertains to make and use the same.

This invention relates to improvements in bearings, and more particularly to that class wherein balls are employed as a means for overcoming friction.

The objects of the invention are to produce an article of manufacture in the way of a bearing for vehicles, which article is complete in itself and is designed to be put upon the market in such complete and assembled condition and to be subsequently sold to and applied by purchasers to their wheels, such purchasers being either the manufacturer of vehicles or the user of the same, as the case may be.

Other objects and advantages of the invention will hereinafter appear, and the novel features of the invention will be particularly pointed out in the claims.

Figure 1:
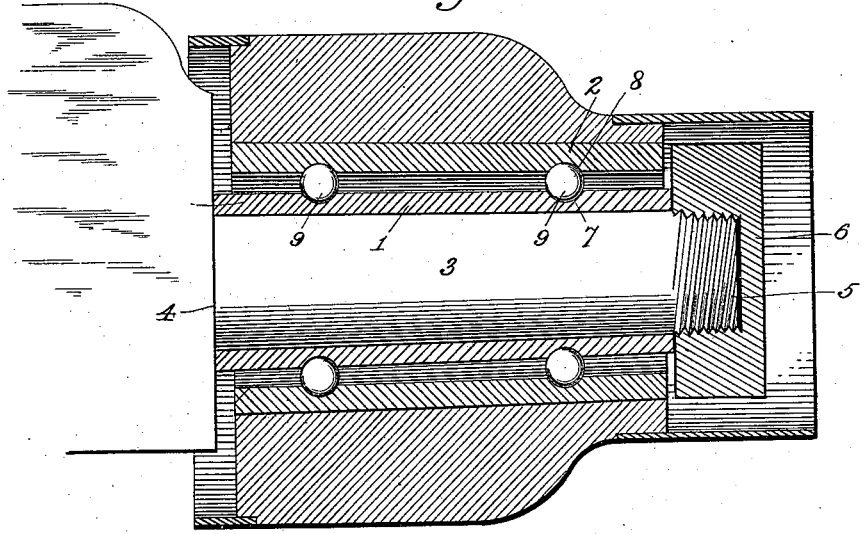
Figure 2:
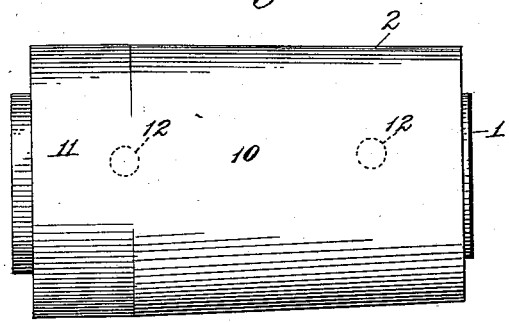
Figure 3:
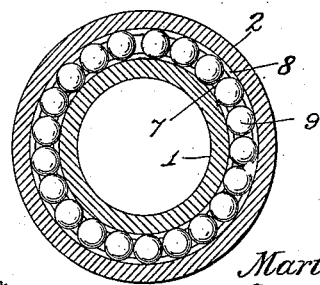

Referring to the drawings, Figure 1 is a vertical or radial sectional view of the hub of a vehicle, the same being provided with our improved bearing. Fig. 2 is a side elevation of the bearing in detail as the same is placed upon the market ready for application to the vehicle-wheel. Fig. 3 is a transverse sectional view of the same.

Like numerals of reference indicate like parts in all the figures of the drawings.

In the practice of our invention we employ an inner and an outer cylinder, which cylinders are designated by the numerals 1 and 2, respectively. The inner cylinder 1 is preferably slightly tapered on its outer and inner sides, almost imperceptibly toward its outer end and is designed to fit snugly upon the tapered spindle 3 of the vehicle, and the distance between its ends slightly exceeds the distance between the collar 4 of the spindle and the beginning of the threaded portion 5 thereof. By this means, when the nut 6 is applied to the threaded portion of the spindle the aforesaid slightly-tapered cylinder will be snugly and immovably bound in position between said nut and the said shoulder 4. This sleeve is preferably formed integral. The thickness of the wall of the cylinder 1 being uniform, it will be apparent that the exterior of the said cylinder will agree in its taper with the interior thereof. The cylinder 1 is provided or has formed therein between its ends a plurality of annular grooves 7, in this instance but two being shown, but it will be apparent that more may be provided, if desired. The outer cylinder 2 is integrally formed and of such greater diameter than the cylinder 1, and also being tapered to agree therewith, there is produced between the two cylinders an annular space unobstructed from end to end. The distance between the ends of the outer cylinder is less than such distance between the ends of the inner cylinder, and the ends of the latter extend beyond those of the former. By such means the ends of the outer cylinder are prevented from contacting either with the collar 4 of the spindle and axle or the inner face of the nut. The outer cylinder has its inner surface provided with annular grooves 8, which agree in number and location with the grooves 7 of the inner cylinder, and both sets of grooves are occupied by a series of bearing-balls 9. The exterior of the outer cylinder is slightly tapered from its outer end to a point near its inner end, as indicated at 10, but the remaining portion is cylindrical, as indicated at 11. This completes the construction of our improved bearing, and it is in this condition that the same is placed upon the market, either to be used by the manufacturer in constructing his wheels or to be inserted in the wheels of a vehicle by the owner thereof in lieu of the usual thimble.

In order to apply the bearing to the hub, it is simply necessary to insert the same tapered end first from the rear end of the hub, fitting the device snugly in position so that it is immovable. The wheel is then placed upon the spindle and the nut tightened against the outer end of the inner cylinder, as before mentioned.

It is our purpose to make the bearings of various sizes in accordance with the standard sizes of the spindles of vehicles.

In order to get the balls into the grooves of the two cylinders, it is preferable to tap the outer cylinder, as indicated by dotted lines at 12, the opening being subsequently closed by plugging or otherwise.

The invention is also applicable to shafts of vessels, &c., and, of course, in such applications of our invention the cylinders would be perfectly true and not tapered.

Inasmuch as it is contemplated to apply this invention to pulley-hubs as well as hubs of vehicles, we use the word "stop" in claim 2 as a generic term and meaning either the usual collar on an axle or a stop such as a boss that may be formed on the pulley-shaft.

Having described our invention, what we claim is—

1. The combination with the tapered spindle 3, having threaded end 5 and collar 4, and the nut 6, of the hub, the fixed outer cylinder 2, internally tapered and grooved as at 8, and having the external tapered portion 10 and cylindrical portion 11, and agreeing in length with the hub, the inner longer cylinder 1 tapered externally and internally to agree with the tapered spindle, and having the grooves 7, and the balls 9 arranged in said grooves, substantially as specified.

2. The combination with a journal provided with a stop, of a hub, the outer bored cylinder of greater diameter than said journal, and having internal annular grooves, the inner cylinder of greater length and less diameter than the outer cylinder and inclosed thereby, said inner cylinder fitting securely upon the journal and abutting at one end against the stop, and provided with external grooves corresponding with those of the outer cylinder, a series of balls located in the grooves between the two cylinders, and a device located on the journal and bearing against the end of the inner cylinder and serving to bind the same against the stop on the journal, substantially as specified.

In testimony whereof we affix our signatures in presence of two witnesses.

MARTIN E. THOMAS.
GOODLOE C. TWYMAN.

Witnesses:
JOS. G. COVINGTON,
J. M. WARD.